Feb. 19, 1935.  L. RANIERI  1,991,957
MOTION PICTURE PROJECTION APPARATUS
Filed Oct. 29, 1931   3 Sheets-Sheet 1

INVENTOR
LUIGI RANIERI
BY
ATTORNEY

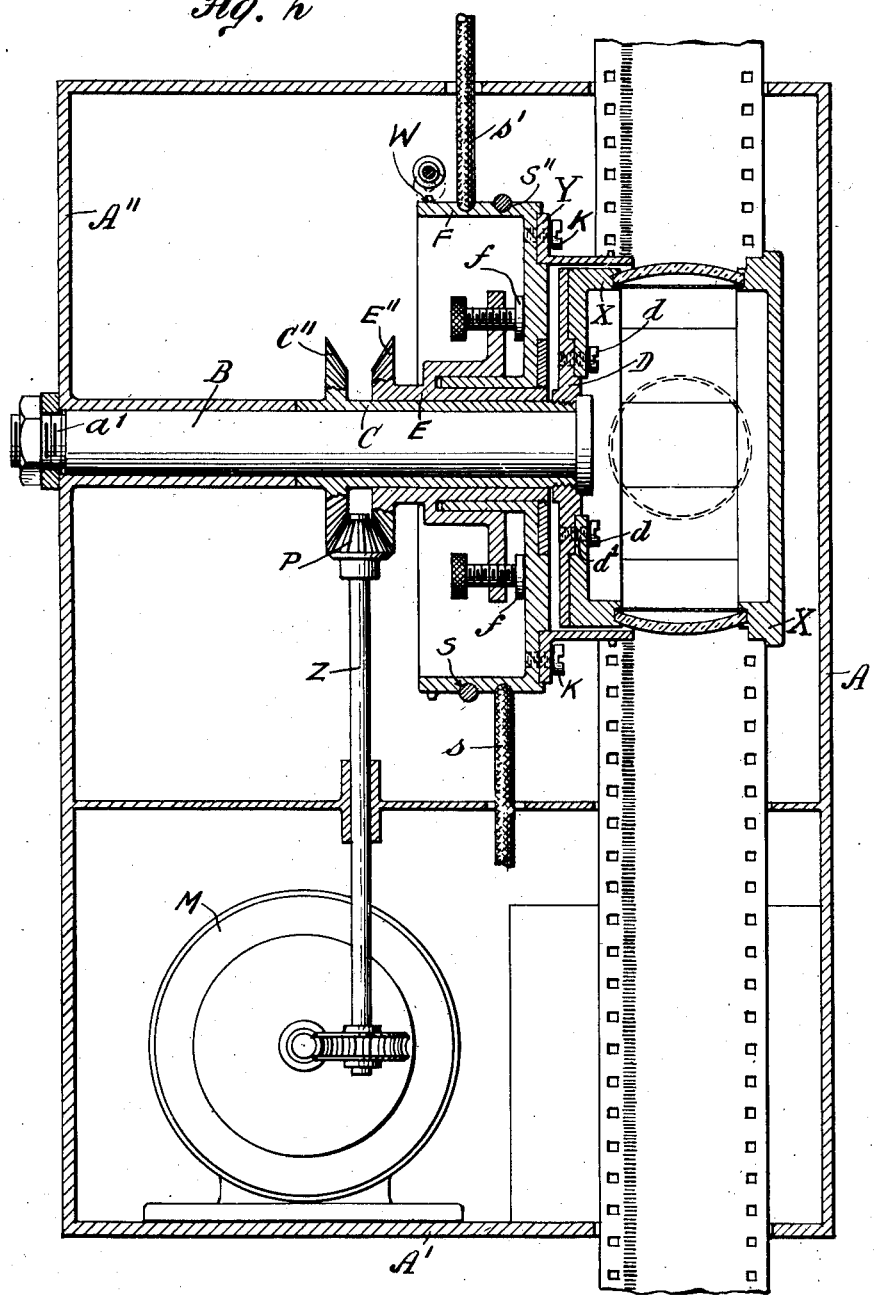

Feb. 19, 1935.    L. RANIERI    1,991,957
MOTION PICTURE PROJECTION APPARATUS
Filed Oct. 29, 1931    3 Sheets-Sheet 3
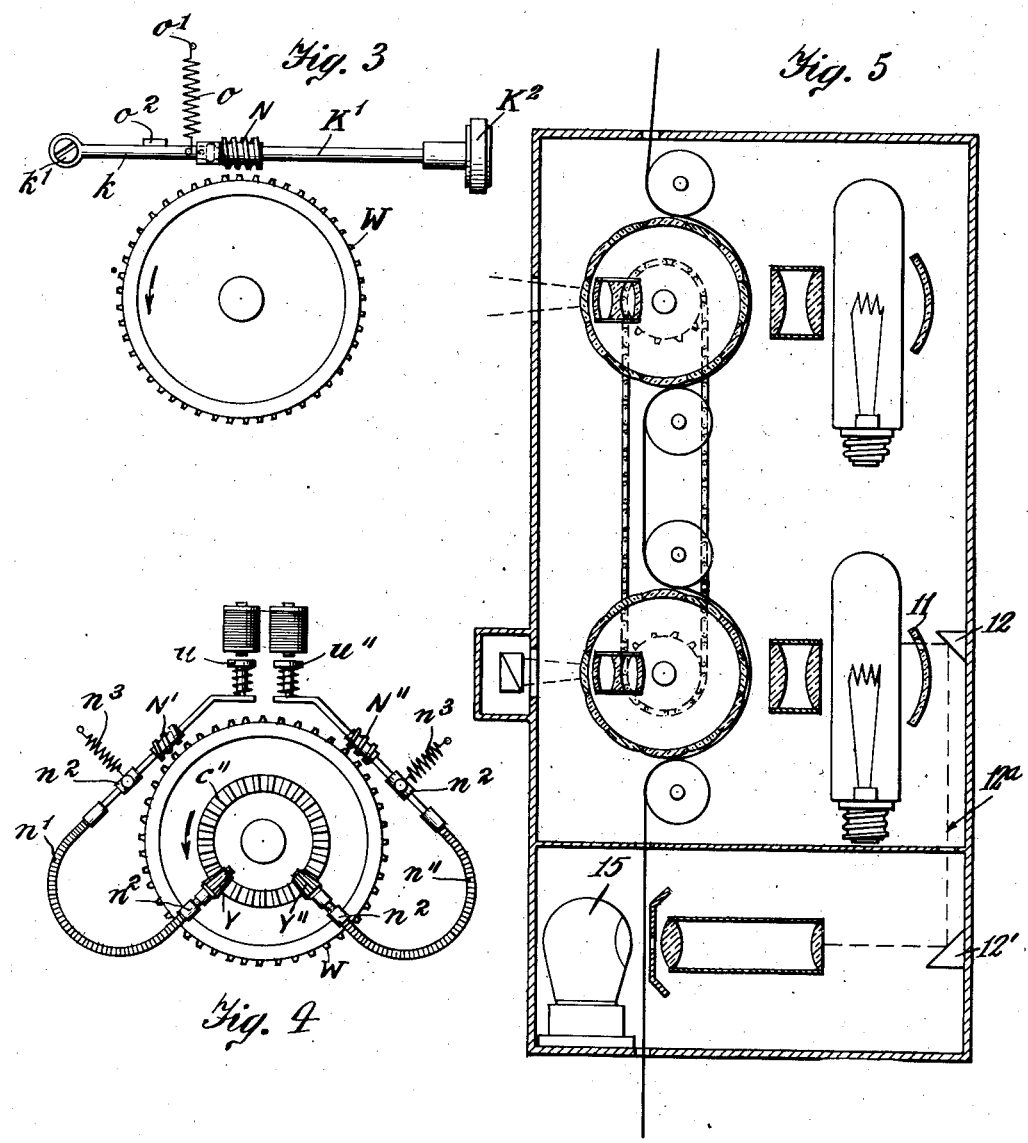
INVENTOR
LUIGI RANIERI
BY
ATTORNEY Patented Feb. 19, 1935

1,991,957

UNITED STATES PATENT OFFICE 1,991,957

MOTION PICTURE PROJECTION APPARATUS

Luigi Ranieri, Rome, Italy

Application October 29, 1931, Serial No. 571,712

6 Claims. (Cl. 88—16.8)

This invention relates to improvements in motion picture projection apparatus and is more particularly appliable to the type of projector wherein the film is continuously moved at a substantially uniform speed.

My invention is based upon the discovery that in a revolving lens system, in which diametrically opposed lenses, (viz: those lens mounted on a lens drum diametrically opposite to each other) necessarily move in opposite directions during rotation thereof, one of such diametrically-opposed and oppositely moving lenses may, without any detrimental optical effect on the projection, be moved close to the film and condenser while the other lens is being utilized as an objective for projection of a picture from the film.

One of the objects of the invention is to improve the type of projection apparatus wherein a condensing lens or lenses, a film and objectives forming a rotating lens system are employed by eliminating the use of prisms, mirrors and like devices which are commonly used in projectors of the character specified, and by providing for the direct non-reflected use of light from the film to the screen, thus avoiding such losses as are necessarily incurred in cases where reflection of the light beam is resorted to.

Another object of my invention is to provide an arrangement or combination of elements whereby the light efficiency (which is generally poor in projectors of the continuously rotating lens type heretofore made) is greatly increased and closely approaches the same condition as an intermittent projector, the light in my improved construction being caused to pass from the lamp through only a condenser, the film and a group of efficient optical elements of short focal length and with no deflections and no useless absorption.

In a projector of the type herein described a necessary condition required to procure apparent steadiness of the images on the screen is that the images and the respective projecting lens be traveling in the same direction and at exactly the same speed.

A feature of my improved projector is the provision of means whereby a film may be continuously and uniformly driven closely adjacent to and coaxially with a rotating lens drum for a portion or half of its circumference and at the same speed but in the opposite direction in respect to the lenses in that portion or half of the drum adjacent to which it is moving, while the pictures on the film so driven will, without distortion be carried by the light beam through such adjacent oppositely-moving lenses into co-action with diametrically-opposed lenses acting as objectives. Each of these objectives so positioned at the opposite extremity of a diameter will not only be moving or running at same speed but in same direction as the film.

With these and other objects in view, the invention comprises the combination of members and arrangement of parts so combined as to co-act and cooperate with each other in the performance of the functions and the accomplishment of the results herein contemplated, and comprises in one of its adaptions the species or preferred form illustrated in the accompanying drawings, in which:—

Fig. 2 is a sectional view of a preferred construction of the apparatus preferably employed by me;

Figs. 3 and 4 are diagrammatic views of different mechanisms which may be employed for adjusting the parts of the apparatus to produce accurate synchronism;

Fig. 5 is a diagrammatic view showing a method of utilizing my apparatus as a multiple projector.

Figure 1:
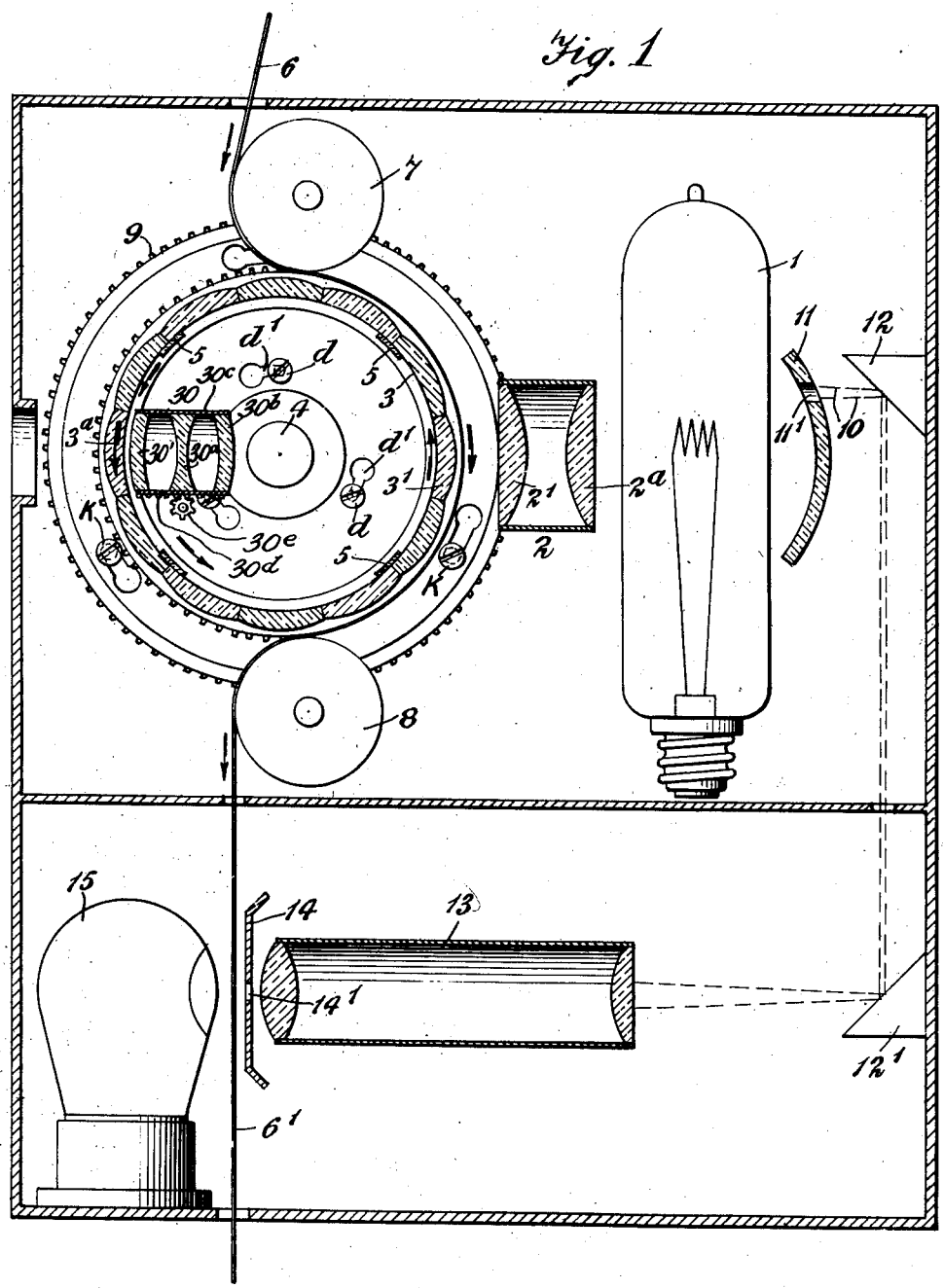
Fig. 1 is a view partly in vertical section and partly diagrammatic showing an arrangement of parts of the apparatus and particularly of the optical elements thereof.

In rotating lens systems, lenses are conventionally positioned on a lens drum at opposite ends of the same diameters, and in the preferred embodiment of my invention, one of two lenses at the extremities of a diameter travels in the opposite direction to the film but so close and adjacent to the film and picture that any effect whatever on the projection is entirely negligible, while the lens at the opposite extremity of the diameter which travels in the same direction as the film, has a focal length approximately equal to the diameter itself and acts fully as an objective with a compartively short focus, thus giving on the screen, which may be positioned radially of the drum, an image of larger size and sharper in outline than can be produced with a similar objective from which the light passes to a prism or reflecting element and thence to the screen.

In the preferred embodiment of my invention, a further lens-group is placed inside the revolving-drum in the path of the image-carrying light beam and serves not only to sharpen the projection but to adjust it finely to enable positioning at any suitable distance from the screen.

It will be understood, of course, that in all continuous projectors which use lens-drums the necessarily limited dimensions of the lenses prevents the use of big sources of light. These continuous projectors are, however, chiefly intended for schools, and for use in relatively small rooms, and their chief advantage, besides their silent running and the nullified stress of the film, resides in the much-lessened eye strain to the young pupils or others viewing such pictures.

In the preferred form of my invention, the lenses forming the optical rotating objectives have their adjacent edges disposed radially of the drum so that they may be mounted with their edges in abutment without interspaces and consequently with no shutter effect by interframes of opaque material and the entire light efficiency is therefore increased.

Fig. 5 illustrates diagrammatically a construction which shows that owing to the reduced dimensions of the optical element, my improved apparatus can be easily converted into a double-projecting machine which will be much less costly to manufacture than two separate machines, as it will require only one motor, only one sound box, less expensive attendants, or may be completely automatic while the commercial efficiency of the apparatus will be doubled, it being capable of projecting into two separate rooms with separate classes or groups attending the program or it may be used to project into two separate show-window displays.

Separate machines can, of course, be built for different sizes of films but an unique standard projector can be used alternately for standard and small-sized films by simple changes in the carrying platforms in the appropriate sprocket-rings and the respective lens-drum.

This will be an economic solution of a problem for schools that desire conventionally to use educational small-sized films and, on special occasions, such as holidays, to rent and project standard amusement films.

In Fig. 1 I have shown diagrammatically an embodiment of my invention which comprises an arrangement of parts and particularly of optical elements adapted to produce the principal results specified. In this figure, 1 indicates a light source or lamp, 2 a condenser comprising lenses $12^1$, $2^a$, while 3 indicates a rotating lens system or drum rotatable about an axis 4 and formed of a series of lenses preferably having their edges disposed radially and arranged in abutment without any spacing, thus avoiding the use of any opaque frame parts between the lens which would give a shutter effect. Lenses so mounted and positioned are preferably held in place by transparent fastening members or connecting elements or under-frame parts 5.

This construction increases the light efficiency avoids the flicker which accompanies the use of opaque frame parts, and provides for a constant and uniform transition from one picture to the next.

The rotating system of lenses 3 above described may be of the type shown in the drawings, viz., meniscus lenses, and may be mounted as shown, the said drawings having been made from a completely operative projector. The mounting of the lenses, per se, is however, not new, being in all essential respects similar to that shown and described in the patent to Gentilini, No. 1,749,026, of March 4, 1930 and the word "objective" hereinabove and hereinafter employed is used in the same sense in which that word is used in describing the rotating system of lenses in said Gentilini patent, the principal new feature in applicant's invention being as hereinabove and hereinafter described, the omission from the lens system of Gentilini and other similar prior art patents of the reflecting prisms and the discovery that one of the diametrically-opposed and oppositely-moving lenses of the rotating system may, without detrimental optical effect, be moved close to the film and condenser while the other diametrically-opposed and oppositely-moving film is being utilized as an objective for projection of a picture from the film.

A film 6 is suitably guided, as by rollers 7 and 8 over a portion of toothed film carrier or crown 9 arranged co-axially with the lens drum 3 and having its perimeter in close adjacency to the perimeter of the lens drum 3. Said lens-drum and film carrier are synchronously driven and a part of the film 6 is thus synchronously carried and driven by the film carrier 9 in close adjacency to the lens drum 3 but in the opposite direction. This lens drum and film carrier are preferably actuated by the same driving element so as to have the same speed. In devices of the character under consideration, it is not only necessary to cause the film and the objective lens to rotate at the same speed but also to cause the same to rotate in the same direction, and I have found that I am enabled to utilize as my objectives for the projection of the pictures on the strip-portion passing over the lens drum, those lenses which are moving at the diametrically opposite peripheral portion of the lens drum and in the same direction as the film, and I find that the passage of the light beam through the rotating lens adjacent to the film which is moving in the opposite direction will apparently have an optical effect which may be entirely negligible. Thus the light from the light source or lamp 1 will after passing through the condenser 2 and the film 6, first pass without distortion or optical effect through a rotating lens, as for example, through the lens $3^1$ which is adjacent to the film and in registry with the light beam and will subsequently pass through a rotating lens, as for example, the lens $3a$, which is diametrically opposite to the first mentioned rotating lens and will be moving in the same direction as the film as well as at the same speed. The rotating lens at the distant end of the diameter of the lens drum will efficiently serve as an objective of short focal length and the picture may be projected from this objective lens drum to the screen. It will be seen that by the use of the mechanism specified, I have improved the construction of projecting apparatus of the type wherein a condensing lens or lenses, a film and objectives forming a rotating lens system are employed by eliminating the use of prisms, mirrors and like devices which are commonly used in projectors of the character specified and by providing for the direct non-reflected use of light from the objective to the screen, thus avoiding such losses as are necessarily incurred in cases where reflection of the light beam is resorted to.

In said Fig. 1 I have also illustrated within the drum an adjusting lens system 30 comprising three lenses, $30'$, $30a$ and $30b$, mounted in a suitable carrier $30c$ and movable by means of a rack and pinion $30d$, $30e$ respectively.

In said Fig. 1, I have also shown a light beam 10 from the lamp 1 passing through a hole $11^1$ in a mirror 11, thence reflected by prisms 12 and $12^1$ through microscope 13, hole $14^1$ in member 14, through film portion $6^1$ to photo-electric cell 15.

In Fig. 2 I have shown in section a preferred construction of my projector which is capable of use with either standard or small-sized films. In this figure, the general cabinet or frame A is provided with a bottom A' and a wall A" which constitute the outstanding supports for the rotating parts.

B is a fixed arbor or axle mounted as, for example, by the screw-threaded end $a$ and $a^1$ on a wall A" and all the rotating elements are rotatably supported on the said arbor B. Mounted to rotate on the arbor B is a hollow shaft C which supports and carries a rotating platform D to which a lens-drum X is demountably attached so as to be instantly interchangeable with other lens drums (not shown). As shown, the platform D has projecting bolt heads $d$ and the lens drum $x$ or drums are provided with bayonet slots $d^1$ adapted to key over the said projecting bolt heads $d$.

A second hollow shaft E is mounted to rotate about and coaxially with the shaft C. The shaft E bears or carries through an adjustable friction device, a platform F to which interchangeable film-driving ring or sprocket Y may be connected. This sprocket Y is attached with elongated holes on fixed screws K. The friction device, as illustrated, comprises the loose mounting of the platform on the shaft E and frictional engagement of shaft and platform by friction members $f—f$.

The members described are rotated by fastening to the shafts C and E two bevel-gears C" and E". Between the gears a bevel pinion P is directly mounted on an elastic-slow-motion shaft Z of an electric motor M which serves as the general power or driving element.

By the use of a proper switch, the motor can turn in both directions, thus reversing at the will of the operator the functioning of all driven parts.

The ring-platform F is provided with two belt-grooves S, S" cooperating with belts $s$, $s'$. These belts, which are preferably extensible spring belts, drive the upper and lower film-reels (not shown).

It is an unique feature of this projector that the optical and mechanical arrangements are both universal and that by simply changing the lens-drum and the sprocket-ring Y (which are mounted, as aforesaid, by bayonet adjustments,) one can use films of this size.

The friction-coupling between the platform carrying the interchangeable sprocket-ring and its moving shaft E, is intended for the easy reframing of the film if, for any reason, shifted from its correct position in front of the lenses. To such reframing, the outer edge of this platform may be provided with a worm-gear W of a very fine pitch which may be employed in cooperation with a worm or worms suitably mounted to adjust the platform F in relation to its frictional driving element and thus to accomplish the required reframing of the film.

In Fig. 3 I have shown a pivoted member $k$ pivotally supported at one end on a screw $k^1$ and having at its opposite end a swivel connection with a shaft $K^1$ having mounted thereon between its ends a worm N adapted to mesh with the worm gear W. The shaft $K^1$ is normally held in elevated position away from the gear W by a spring O stretched between the pivoted member $k$ and a fixed pin $O^1$, a movement limiting or stop member $O^2$ being as shown, to hold the shaft $K^1$ in properly elevated position. A handle $K^2$ attached to the shaft $K^1$ is positioned outside the cabinet and by depressing this handle and turning it, the proper reframing adjustment may be readily accomplished.

In Fig. 4, I have shown another form of adjusting means for reframing the film. As illustrated, I support to extend on opposite sides of the gear W, on suitable supports $n^2$, and not touching it, two worms N', N", which by flexible shafts $n^1$, $n''$ and pinions Y, Y" are driven continuously and in opposite directions, by the said bevel gears C" and E" and are normally held elevated by springs $n^3$. By means of two keys, U, U" also held resiliently elevated, each worm independently, can be brought momentarily in contact with the gear W to engage with the teeth thereof, one worm to shift accordingly, backwards or forwards, from a given position in respect to the platform F and consequently the film may be shifted accordingly in relation to the lenses and this may be accomplished without the slightest interference with the moving parts.

The keys U, U" may be, if so desired, operated by an electromagnet or electromagnets at any distance from the apparatus.

A sound box is provided in the lower part of the projector casing or housing. The film being uniformly running, no loops are necessary and the sound track can be printed very close to the corresponding picture.

The same projection bulb may also be employed to serve as an exciting lamp. A small hole on a reflecting mirror will correspond to the sound track position. Part of the lateral light not affecting the projection will pass through the hole to the rear of the mirror 11 and will fall upon a prism or mirror 12 of a little periscope $12a$. The lower mirror 12' of this periscope directs the light beam on the sleet-diaphragm and through the sound track to the normal photocell 15. The use of the same current, for motor, projection lamp and exciting lamp, if an alternating current is available, may be objected to as liable to produce a "hum" or ground noise on the amplifier, but a shock coil system can be provided to absorb such hum, and furthermore, for school purposes the slight ground noise, if present, is not so highly objectionable especially as the amplification need not be too high.

In a single casing (see Fig. 5) of slightly increased dimensions, upon a second arbor parallel to the first arbor of the apparatus, a second lens drum and a second sprocket ring may be provided. The second lens-drum may be driven by the first one through a chain and a sprocket-wheel; and the second sprocket ring may be driven by the film itself.

Obviously a second lamp and a second condenser should be applied at the optical axis of the second projection and a prism or a mirror can be used to deflect the second projection to the right or the left on a second screen.

The second lower projection will differ from the upper projection only by the diminished light efficiency due to the use of prism for deflection, but will still be good. The sound box will be unique and the whole double acting machine will be much cheaper to manufacture than two. A single operator (if necessary at all) may be used for both projections and still the public attendance can be doubled in two separate adjacent rooms or projections may be used in two adjacent display-windows. The motor only of this double acting apparatus will be slightly more expensive.

The two different screens will be practically the same height from the floor and the machine can produce direct or rear projection on translux screens.

In operation, the outer edge of the film-carrying element serves to carry both the upper feeding reel and the lower storing reel through spring metallic belt passing through the top and bottom of the casing or housing.

The film reels are contained in two separate fireproof boxes. These boxes, normally carried apart, are mounted at the moment of the projection one on the upper and the other on the lower part of the machine casing itself. They are each provided with corresponding pulleys for winding and rewinding. The spring belts are positioned in the machine casing ready to be shifted into the respective grooves therefor.

The film is continuously then carried by the sprocket ring through the operation of the electric motor downwards and the film reels are also driven by the film sprocket element proportionally to its displacement so that without excessive pull the film is fed from the feeding reel to the storing reel or rewinded on the upper reel after the projection.

The electric motor can reverse its motion at will by a proper switch so that the film can be rewinded to the upper reel.

The functioning of the whole optical system is independent from the sequences of rotation of the mechanical elements. It is therefore, possible to run the film backwards without inconvenience except that the motions will appear reversed.

From the above it will be seen that this new continuous aprismatic rotating projector can with an exceptional good light efficiency and very simple mechanism be employed to (A) Project any normal standard film;

(B) Project any other small sized film simply and instantly changing the sprocket ring and the lens-drum or their respective carrying platforms A further advantage is linked with the extreme reduced proportion of the mechanical moving parts of this projector.

Having described my invention, I claim:—

1. Motion picture projection apparatus embodying, in combination, a film, a rotatable film-driving element for moving said film, a circular rotating lens-carrier movable in synchronism with said film-driving element and provided with a system of lenses, some of said lenses being movable adjacent to said moving film in an opposite direction thereto so as to have a negligable optical effect while other lenses diametrically opposite to said adjacently-moving lenses move in the same direction as said film to function as objectives to project pictures directly and without reflection, a light source, a condenser arranged between said light source and said lens carrier and directing light rays through the adjacent lenses diametrically through the carrier to the lenses positioned diametrically opposite to said adjacent lenses.

2. Motion picture projection apparatus embodying, in combination, a film, a rotatable film-driving element for moving said film, a circular rotating lens carrier movable in synchronism with said film-driving element and provided with a system of lenses mounted around the periphery of said circular lens-carrier, each having a focal length substantially equal to the diameter of the rotating lens-carrier, some of said lenses being movable adjacent to said moving film in an opposite direction thereto so as to have a negligable optical effect while other lenses diametrically opposite to said adjacently-moving lenses move in the same direction as said film to function as objectives to project pictures directly and without reflection, a light source, a condenser arranged between said light source and said lens-carrier and directing light rays through the adjacent lenses diametrically through the carrier to the lenses positioned diametrically opposite to said adjacent lenses.

3. Motion picture projection apparatus embodying, in combination, a film, a rotatable film-driving element for moving said film in the arc of a circle, a circular rotating lens carrier movable in synchronism with said film-driving element provided with a system of lenses mounted around the periphery of said circular lens-carrier, some of said lenses being movable adjacent to said moving film in an opposite direction thereto so as to have a negligable optical effect while other lenses diametrically opposite to said adjacently moving lenses move in the same direction as said film to function as objectives to project pictures directly and without reflection, a common driving element for moving said film and lens carrier simultaneously, a light source, a condenser arranged between said light source and said lens carrier and directing light rays through the adjacent lenses diametrically through the carrier to the lenses positioned diametrically opposite to said adjacent lenses.

4. Motion picture projection apparatus embodying, in combination, an axle, a primary hollow shaft mounted on said axle, a secondary hollow shaft mounted co-axially on the said first-mentioned hollow shaft, a common driving element for driving said primary and secondary hollow shafts synchronously but in opposite directions, a film mounted to be moved by one of said shafts, a circular rotating lens carrier having on the periphery thereof a system of lenses mounted on the other, said carrier having lenses moving adjacent to said film in a direction opposite to said film so as to have a negligable optical effect and diametrically-opposite lenses moving in the same direction and synchronously with said film to function as objectives, a light source, a condenser arranged between said light source and said lens carrier and directing light rays through the adjacent lenses diametrically through the carrier to the lenses positioned diametrically opposite to said adjacent lenses, said system of lenses being arranged in such relationship that said diametrically-opposite lenses of the system function as objectives to project pictures directly and without reflection.

5. Motion picture projection apparatus embodying, in combination, an axle, a primary hollow shaft mounted on said axle, a secondary hollow shaft mounted co-axially on the said first-mentioned hollow shaft, a common driving element for driving said primary and secondary hollow shafts synchronously but in opposite directions, a rotating lens-carrying cylinder mounted on one of said shafts and having a system of lens mounted in the periphery thereof; a film-driving platform mounted on the other of said shafts, a film carried by said film-driving platform, means for reframing the film pictures in relation to the lenses in said cylinder, a light source, a condenser arranged between said light source and said lens carrier and directing light rays through the adjacent lenses diametrically through the carrier to the lenses positioned diametrically opposite to said adjacent lenses, said system of lenses being arranged in such relationship that said diametrically-opposite lenses of the system function as objectives to project pictures directly and without reflection.

6. Motion picture projection apparatus embodying, in combination, an axle, a primary hollow shaft mounted on said axle, a secondary hollow shaft mounted co-axially on the said first-mentioned hollow shaft, a common driving element for driving said primary and secondary hollow shafts synchronously but in opposite directions, a rotating lens-carrying cylinder mounted on one of said shafts and having a system of lens mounted in the periphery thereof; a film-carrying platform frictionally mounted on the other of said shafts, reframing means comprising a worm-wheel carried by said film-carrying platform and a worm engageable and disengageable therewith to reframe the film by shifting the film-driving platform in relation to its driving shaft, a film mounted on said film-driving platform, a rotating lens cylinder mounted on the other and having some of its lenses moving adjacent to said film in an opposite direction thereto and other diametrically-opposite lenses moving synchronously and in the same direction to function as objectives, a light source, a condenser arranged between said light source and said lens system and direction light rays through the adjacent lens to lens positioned diametrically opposite thereto, said system of lenses being arranged in such relationship that said diametrically opposite lenses of the system will function as objectives to project pictures directly and without reflection.

LUIGI RANIERI.